(12) United States Patent
Choi et al.

(10) Patent No.: US 12,509,744 B2
(45) Date of Patent: Dec. 30, 2025

(54) METHOD FOR PREPARING NICKEL SULFATE AQUEOUS SOLUTION FROM NICKEL-CONTAINING RAW MATERIAL

(71) Applicants: KOREA ZINC CO., LTD., Seoul (KR); KEMCO, Seoul (KR)

(72) Inventors: Heon Sik Choi, Ulsan (KR); Je Joong Lee, Seoul (KR)

(73) Assignees: KOREA ZINC CO., LTD., Seoul (KR); KEMCO (KR)

( * ) Notice: Subject to any disclaimer, the term of this patent is extended or adjusted under 35 U.S.C. 154(b) by 0 days.

(21) Appl. No.: 18/811,792

(22) Filed: Aug. 22, 2024

(65) Prior Publication Data
US 2025/0066871 A1   Feb. 27, 2025

Related U.S. Application Data

(63) Continuation of application No. PCT/KR2024/009459, filed on Jul. 4, 2024.

(51) Int. Cl.
*C22B 3/06* (2006.01)
*C22B 1/02* (2006.01)
(Continued)

(52) U.S. Cl.
CPC ............ *C22B 3/06* (2013.01); *C22B 1/02* (2013.01); *C22B 3/26* (2021.05); *C22B 23/005* (2013.01);
(Continued)

(58) Field of Classification Search
CPC .... C22B 3/06; C22B 3/26; C22B 1/02; C22B 23/005; C22B 23/0415; C22B 23/0453
(Continued)

(56) References Cited

U.S. PATENT DOCUMENTS 6,702,871 B1   3/2004   Fugleberg et al.
11,718,895 B2   8/2023   Ariyoshi et al.
(Continued)

FOREIGN PATENT DOCUMENTS

AU   2019222783 B2   3/2020
CN   109110826 A   1/2019
(Continued)

OTHER PUBLICATIONS

Agrawal et al, "A comprehensive review on the hydrometallurgical process for the production of nickel and copper powders by hydrogen reduction", Materials Research Bulletin, Oct. 2005, pp. 879-892.
(Continued)

*Primary Examiner* — Colin W. Slifka
(74) *Attorney, Agent, or Firm* — CANTOR COLBURN LLP (57) ABSTRACT

Provided herein is a method for preparing a nickel sulfate aqueous solution, comprising: (A-i) a reduction heat treatment process for thermally treating a first raw material containing nickel and lithium; (B) a first leaching process for leaching the heat-treated product produced by the reduction heat treatment process; (A-ii) a roasting process for thermally treating a second raw material containing nickel and sulfur; (C) a second leaching process for leaching the first leaching residue produced by the first leaching process and the calcine produced by the roasting process; (D) a neutralization process for neutralizing the second leached solution produced by the second leaching process; and (E) a solvent extraction process for refining nickel in the neutralized solution produced by the neutralization process.

30 Claims, 3 Drawing Sheets (51) Int. Cl.
*C22B 3/00* (2006.01)
*C22B 3/26* (2006.01)
*C22B 23/00* (2006.01)

(52) U.S. Cl.
CPC ...... *C22B 23/0415* (2013.01); *C22B 23/0453* (2013.01)

(58) Field of Classification Search
USPC ........................................................ 423/139
See application file for complete search history.

(56) References Cited

U.S. PATENT DOCUMENTS

| | | | |
|---|---|---|---|
| 11,926,882 | B1 | 3/2024 | Choi et al. |
| 2004/0159187 | A1 | 8/2004 | Hamalainen et al. |
| 2005/0211022 | A1 | 9/2005 | Roche et al. |
| 2013/0074653 | A1 | 3/2013 | Kobayashi et al. |
| 2019/0352740 | A1 | 11/2019 | Zhao et al. |
| 2020/0044295 | A1 | 2/2020 | Arakawa et al. |
| 2020/0376564 | A1 | 12/2020 | Heguri et al. |
| 2021/0324495 | A1 | 10/2021 | Rohde et al. |
| 2021/0354997 | A1 | 11/2021 | Osten et al. |
| 2022/0010407 | A1 | 1/2022 | Rohde et al. |
| 2023/0071697 | A1 | 3/2023 | Takenouchi et al. |
| 2023/0202863 | A1 | 6/2023 | Jeon et al. |
| 2023/0313337 | A1 | 10/2023 | Miyazaki et al. |
| 2024/0014457 | A1 | 1/2024 | Choi et al. |
| 2024/0051843 | A1 | 2/2024 | Liu et al. |
| 2024/0191322 | A1 | 6/2024 | Ryu et al. |
| 2024/0228311 | A1 | 7/2024 | Choi et al. |
| 2024/0240279 | A1 | 7/2024 | Choi et al. |

FOREIGN PATENT DOCUMENTS

| | | | |
|---|---|---|---|
| CN | 111235384 | A | 6/2020 |
| CN | 112400029 | A | 2/2021 |
| CN | 112646974 | A | 4/2021 |
| CN | 113321248 | A | 8/2021 |
| CN | 114959252 | A | 8/2022 |
| EA | 014105 | B1 | 10/2010 |
| EP | 3677695 | A1 | 7/2020 |
| EP | 3926061 | A1 | 12/2021 |
| JP | S5953638 | A | 3/1984 |
| JP | 2012031446 | A | 2/2012 |
| JP | 2015117152 | A | 6/2015 |
| JP | 2018088310 | A | 6/2018 |
| JP | 2019112661 | A | 7/2019 |
| JP | 2020180362 | A | 11/2020 |
| JP | 2021105206 | A | 7/2021 |
| JP | 2022509811 | A | 1/2022 |
| KR | 20200051925 | A | 5/2020 |
| KR | 20210075502 | A | 6/2021 |
| KR | 20210152270 | A | 12/2021 |
| KR | 102493104 | B1 | 1/2023 |
| KR | 102509344 | B1 | 3/2023 |
| KR | 102543371 | B1 | 6/2023 |
| KR | 20230107003 | A | 7/2023 |
| RU | 2236475 | C2 | 9/2004 |
| RU | 2287598 | C2 | 11/2006 |
| RU | 2568223 | C2 | 11/2015 |
| RU | 2596510 | C1 | 9/2016 |
| RU | 2618595 | C1 | 5/2017 |
| RU | 2621548 | C1 | 6/2017 |
| WO | 0056942 | A1 | 9/2000 |
| WO | 2007039663 | A1 | 4/2007 |
| WO | 2015009204 | A2 | 1/2015 |
| WO | 2019/045161 | A1 | 3/2019 |
| WO | 2020011765 | A1 | 1/2020 |
| WO | 2020166735 | A1 | 8/2020 |
| WO | 2021166755 | A1 | 8/2021 |
| WO | 2022050248 | A1 | 3/2022 |
| WO | 2023118037 | A1 | 6/2023 |

OTHER PUBLICATIONS

ITS-12-2016 Nickel and cobalt production, Moscow, NTD Bureau, 2016.
Kolmachikhina, "Two-Stage Hydrochloride Leaching of Oxidized Nickel Ore From the Serovskoe Deposit," 2020, 6 pages.
V.V. Volynsky, "Methods for recycling nickel-cadmium batteries electrodes," Vestnik Saratovsky State Technological University, 2006, N3 (14), issue 1, p. 104-112.
Russian Office Action for RU Application No. 2024124396 mailed on Oct. 30, 2024.
Russian Office Action for RU Application No. 2024124398 mailed on Oct. 30, 2024.
Russian Office Action for RU Application No. 2024124399 mailed on Oct. 30, 2024.
Russian Office Action for RU Application No. 2024124401 mailed on Oct. 30, 2024.
Russian Office Action for RU Application No. 2024124402 mailed on Oct. 30, 2024.
U.S. Office Action for U.S. Appl. No. 18/811,796 mailed on Nov. 1, 2024.
U.S. Office Action for U.S. Appl. No. 18/811,781 mailed on Nov. 27, 2024.
Australian Office Action for AU Application No. 2024213148 mailed on Nov. 29, 2024.
Australian Office Action for AU Application No. 2024213149 mailed on Nov. 29, 2024.
U.S. Office Action for U.S. Appl. No. 18/811,784 mailed on Nov. 18, 2024.
Australian Office Action for AU Application No. 2024213150 mailed on Feb. 19, 2025.
Australian Office Action for AU Application No. 2024213153 mailed on Feb. 19, 2025.
U.S. Office Action for U.S. Appl. No. 18/811,789 mailed on Feb. 11, 2025.
U.S. Office Action for U.S. Appl. No. 18/811,789 mailed on Jun. 4, 2025.
Japanese Office Action for JP Application No. 2024-572188 mailed on Aug. 26, 2025.
Japanese Office Action for JP Application No. 2024-572190 mailed on Aug. 26, 2025.
Japanese Office Action for JP Application No. 2024-572191 mailed on Aug. 26, 2025.
Japanese Office Action for JP Application No. 2024-572193 mailed on Aug. 26, 2025.
Japanese Office Action for JP Application No. 2024-572195 mailed on Aug. 26, 2025.
U.S. Office Action for U.S. Appl. No. 18/811,789 mailed on Sep. 29, 2025 (25 Pages).

METHOD FOR PREPARING NICKEL SULFATE AQUEOUS SOLUTION FROM NICKEL-CONTAINING RAW MATERIAL

CROSS-REFERENCE TO RELATED APPLICATION

This application is a Continuation Application of PCT International Application No. PCT/KR2024/009459, filed on Jul. 4, 2024, which claimed the benefit of Korean Patent Applications No. 10-2023-0112131 and No. 10-2024-0080945, filed on Aug. 25, 2023, and Jun. 21, 2024, respectively, the entire content of each of which is hereby incorporated by reference.

TECHNICAL FIELD

The present disclosure relates to a method for preparing a nickel sulfate aqueous solution from a nickel-containing raw material. More specifically, the present disclosure relates to a method for preparing a high-purity nickel sulfate aqueous solution from a nickel-containing raw material, wherein the high-purity nickel sulfate aqueous solution can find applications in various fields (especially, precursor raw materials as cathode active materials in lithium batteries).

BACKGROUND

Nickel can be recovered from various raw materials such as nickel metal, nickel matte, nickel concentrate, and nickel-containing process by-products. It is known that among various forms of recovered nickel, nickel sulfate aqueous solutions preferably contain nickel at content of 110 g/L or higher, with impurities amounting to a few hundred mg/L or less, for ordinary cases.

Conventionally, such a nickel sulfate aqueous solution was produced as a high-purity nickel sulfate solution through leaching at atmospheric pressure with inorganic acids, neutralization with sodium hydroxide or sodium carbonate, and impurity removal.

However, such conventional methods are disadvantageous in that there are a limited number of raw materials soluble to specific inorganic acids. In conventional methods, substances used as neutralizing agents (e.g., Na) are removed by washing with water after sludge filtration. This way of Na elimination increases the volume of wastewater and requires significant processing time, resulting in lowering productivity and increasing wastewater treatment costs.

SUMMARY

The present disclosure aims to provide an all-in-one process for preparing a highly pure nickel sulfate aqueous solution from a nickel-containing composite raw material, which is a hybrid process combining pyrometallurgy and hydrometallurgy technologies, wherein appropriate responses can be made according to nickel-containing raw materials.

The present disclosure is also to provide an economical and environmentally friendly process that allows for the recycling of process by-products.

Furthermore, the present disclosure aims to provide an environmentally friendly process that allows for the selective isolation of lithium, the conversion of composite compounds into single compounds, and the recovery of inorganic acids from harmful gas through a pyrometallurgy pre-treatment.

Moreover, the present disclosure aims to provide an economical and environmentally friendly process that minimizes the inflow of impurities from precipitants or secondary raw materials and reduces additional wastewater treatment costs by using a hydrometallurgy process that includes solvent extraction, whereby the consumption of auxiliary materials can be reduced through recycling of the process solution.

Various embodiments of the present disclosure are related to a method for preparing a nickel sulfate aqueous solution comprising: (A-i) a reduction heat treatment process for thermally treating a first raw material containing nickel and lithium; (B) a first leaching process for leaching the heat-treated product produced by the reduction heat treatment process; (A-ii) a roasting process for thermally treating a second raw material containing nickel and sulfur; (C) a second leaching process for leaching the first leaching residue produced by the first leaching process and calcine produced by the roasting process; (D) a neutralization process for neutralizing the second leachate (leached solution) produced by the second leaching process; and (E) a solvent extraction process for refining nickel in the neutralized solution produced by the neutralization process.

In the method for preparing a nickel sulfate aqueous solution according to an embodiment of the present disclosure, the first raw material and the second raw material may each independently comprise at least one selected from the group consisting of an oxide, a hydroxide, a sulfide, and a sulfur oxide, the oxide, hydroxide, sulfide, and sulfur oxide each independently containing ore, matte, black mass (BM), black powder (BP), mixed hydroxide precipitate (MHP), mixed carbonate precipitate (MCP), mixed sulfide precipitate (MSP), or a mixture thereof.

In the method for preparing a nickel sulfate aqueous solution according to an embodiment of the present disclosure, the first raw material may comprise nickel in a form of nickel oxide or nickel metal composite oxide.

In the method for preparing a nickel sulfate aqueous solution according to an embodiment of the present disclosure, the second raw material may comprise nickel in a form of nickel sulfide.

In the method for preparing a nickel sulfate aqueous solution according to an embodiment of the present disclosure, the reduction heat-treatment process may be carried out at 650 to 950° C. in a manner of introducing the first raw material into a thermal treatment equipment and injecting nitrogen gas.

In the method for preparing a nickel sulfate aqueous solution according to an embodiment of the present disclosure, the first leaching process may be carried out using a first leaching agent including an inorganic acid, water, or a mixture thereof.

In the method for preparing a nickel sulfate aqueous solution according to an embodiment of the present disclosure, the first leached solution obtained by the first leaching process contains lithium and the first leaching residue may contain nickel.

In the method for preparing a nickel sulfate aqueous solution according to an embodiment of the present disclosure, the roasting process may be carried out at 650 to 950° C. in a manner of introducing the second raw material into a thermal treatment equipment and injecting oxygen gas.

In the method for preparing a nickel sulfate aqueous solution according to an embodiment of the present disclosure, in the second leaching process, the first leaching residue and the calcine may be leached in an atmospheric reactor and a high-temperature, high-pressure reactor, respectively.

In the method for preparing a nickel sulfate aqueous solution according to an embodiment of the present disclosure, the second leaching process may be carried out using a second leaching agent including an inorganic acid, or a mixture of inorganic acid and water.

In the method for preparing a nickel sulfate aqueous solution according to an embodiment of the present disclosure, the second leaching process may be performed at a temperature of 150 to 250° C. and a pressure of 800 to 4300 kPa.

In the method for preparing a nickel sulfate aqueous solution according to an embodiment of the present disclosure, the second leaching process may be carried out in an environment with an acidity of 100 to 200 g/L.

In the method for preparing a nickel sulfate aqueous solution according to an embodiment of the present disclosure, the neutralizing process may be carried out using a neutralizing agent including MHP, MCP, nickel hydroxide ($Ni(OH)_2$), nickel carbonate ($NiCO_3$), sodium hydroxide (NaOH), sodium carbonate ($Na_2CO_3$), calcium hydroxide ($Ca(OH)_2$), magnesium hydroxide ($Mg(OH)_2$), calcium oxide (CaO), magnesium oxide (MgO), or a mixture thereof.

In the method for preparing a nickel sulfate aqueous solution according to an embodiment of the present disclosure, the neutralization process may be carried out at 80° C. and a pH of 2 to 4.5.

In the method for preparing a nickel sulfate aqueous solution according to an embodiment of the present disclosure, the neutralization may be carried out for 2 hours or more and the neutralized solution produced by the neutralization process has a residual acidity of 10 g/L or less.

In the method for preparing a nickel sulfate aqueous solution according to an embodiment of the present disclosure, the solvent extraction process may comprise: (E-i) a first solvent extraction process for refining nickel from the neutralized solution produced by the neutralization process; and (E-ii) a second solvent extraction process for refining nickel from the post-first extraction solution produced by the first solvent extraction process.

In the method for preparing a nickel sulfate aqueous solution according to an embodiment of the present disclosure, the first solvent extraction process may be performed by: (i) a first loading process for loading nickel into an organic phase by adding a first organic extractant to the nickel sulfate aqueous solution; (ii) a first extraction process for back extracting nickel into an aqueous phase by adding the post-first loading organic extractant to the neutralized solution; (iii) a first scrubbing process for recovering cobalt into an aqueous phase by adding an inorganic extract into the post-first extraction organic extractant; (iv) a first stripping process for recovering copper into an aqueous phase by adding an inorganic extractant to the post-first scrubbing organic extractant; or a combination thereof.

In the method for preparing a nickel sulfate aqueous solution according to an embodiment of the present disclosure, the first organic extractant in the first loading process may be used at a volume ratio of 3.5 to 6.5 to the nickel sulfate aqueous solution.

In the method for preparing a nickel sulfate aqueous solution according to an embodiment of the present disclosure after the post-first loading solution produced by the first loading process may be allowed to undergo precipitation, the nickel-containing byproduct thus precipitated may be used as a neutralization agent in the neutralization process.

In the method for preparing a nickel sulfate aqueous solution according to an embodiment of the present disclosure, the post-first loading organic extractant may be used at a volume ratio of 1.5 to 4.5 to the neutralized solution in the first extraction process.

In the method for preparing a nickel sulfate aqueous solution according to an embodiment of the present disclosure, volume ratios of the inorganic extractants to the organic extractants in the first scrubbing process and the first stripping process may each range from 9.5 to 12.5.

In the method for preparing a nickel sulfate aqueous solution according to an embodiment of the present disclosure, the first scrubbing process may be carried out at a pH of 2 to 3.

In the method for preparing a nickel sulfate aqueous solution according to an embodiment of the present disclosure, the first stripping process may be carried out at a pH of 0.5 to 1.5.

In the method for preparing a nickel sulfate aqueous solution according to an embodiment of the present disclosure, the post-first stripping organic extractant may be reused as the first organic extractant.

In the method for preparing a nickel sulfate aqueous solution according to an embodiment of the present disclosure, the method may further comprise a first precipitation process for recovering cobalt by adding a first precipitation agent to the post-first scrubbing solution produced by the first scrubbing process.

In the method for preparing a nickel sulfate aqueous solution according to an embodiment of the present disclosure, the method may further comprise a second precipitation process for recovering copper by adding a second precipitation agent to the post-first stripping solution produced by the first stripping process.

In the method for preparing a nickel sulfate aqueous solution according to an embodiment of the present disclosure, the second solvent extraction process may be carried out by: (i) a second loading process for loading nickel into an organic phase by adding a second organic extractant to the nickel sulfate aqueous solution; (ii) a second extraction process for back extracting nickel into an aqueous phase by adding the post-second loading organic extractant to the post-first extraction solution; (iii) a second stripping process for recovering impurities into an aqueous phase by adding an inorganic extractant to the post-second extraction organic extractant; or a combination thereof.

In the method for preparing a nickel sulfate aqueous solution according to an embodiment of the present disclosure, the second organic extractant may be used at a volume ratio of 4.5 to 8.5 to the nickel sulfate aqueous solution in the second loading process.

In the method for preparing a nickel sulfate aqueous solution according to an embodiment of the present disclosure, after the post-second loading solution produced by the second loading process may be allowed to undergo precipitation, the nickel-containing byproduct thus precipitated may be used as a neutralization agent in the neutralization process.

In the method for preparing a nickel sulfate aqueous solution according to an embodiment of the present disclosure, the post-second loading organic extractant may be used at a volume ratio of 0.3 to 1.5 to the post-first extraction solution in the second extraction process.

In the method for preparing a nickel sulfate aqueous solution according to an embodiment of the present disclosure, the organic extractant may be used at a volume ratio of 3.5 to 7.5 to the inorganic extractant in the second stripping process.

In the method for preparing a nickel sulfate aqueous solution according to an embodiment of the present disclosure, the second stripping process may be carried out at a pH of 0.25 to 1.5.

In the method for preparing a nickel sulfate aqueous solution according to an embodiment of the present disclosure, the post-second stripping organic extractant may be reused as a second organic extractant.

According to the present disclosure, a highly pure nickel sulfate aqueous solution can be prepared from various nickel-containing raw materials.

According to the present disclosure, thermal treatment in the reduction heat treatment process enables selective leaching and recovery of lithium from lithium-containing raw materials that exhibit strong chemical bonds therein.

According to the present disclosure, various nickel-containing raw materials with various forms of chemical bonds therein are transformed into a single phase by using a roasting process, ensuring uniformity in subsequent processes, whereby the process can be flexibly adapted to the rapidly changing nickel raw material market, contributing to the applicability of the entire process.

According to the present disclosure, process by-products can be used as neutralizing agents in the neutralization process to block the inflow of impurities from commonly used neutralizing agents or precipitants, with the concomitant increase of the concentration of the target metal, nickel.

According to the present disclosure, nickel sulfate may be suitably used as a precursor material for the cathode active material of lithium secondary batteries.

DETAILED DESCRIPTION

Embodiments of the present disclosure are illustrated for the purpose of explaining the technical idea of the present disclosure. The scope of the rights according to the present disclosure is not limited to the embodiments presented below or the detailed descriptions of such embodiments.

Embodiments of the present disclosure are illustrated for the purpose of explaining the technical idea of the present disclosure. The scope of the rights according to the present disclosure is not limited to the embodiments presented below or the detailed descriptions of such embodiments.

Herein, unless otherwise specified, "%" is understood to be based on weight (wt).

Below, a description will be given of the present disclosure with reference to the drawings.

Figure 1:
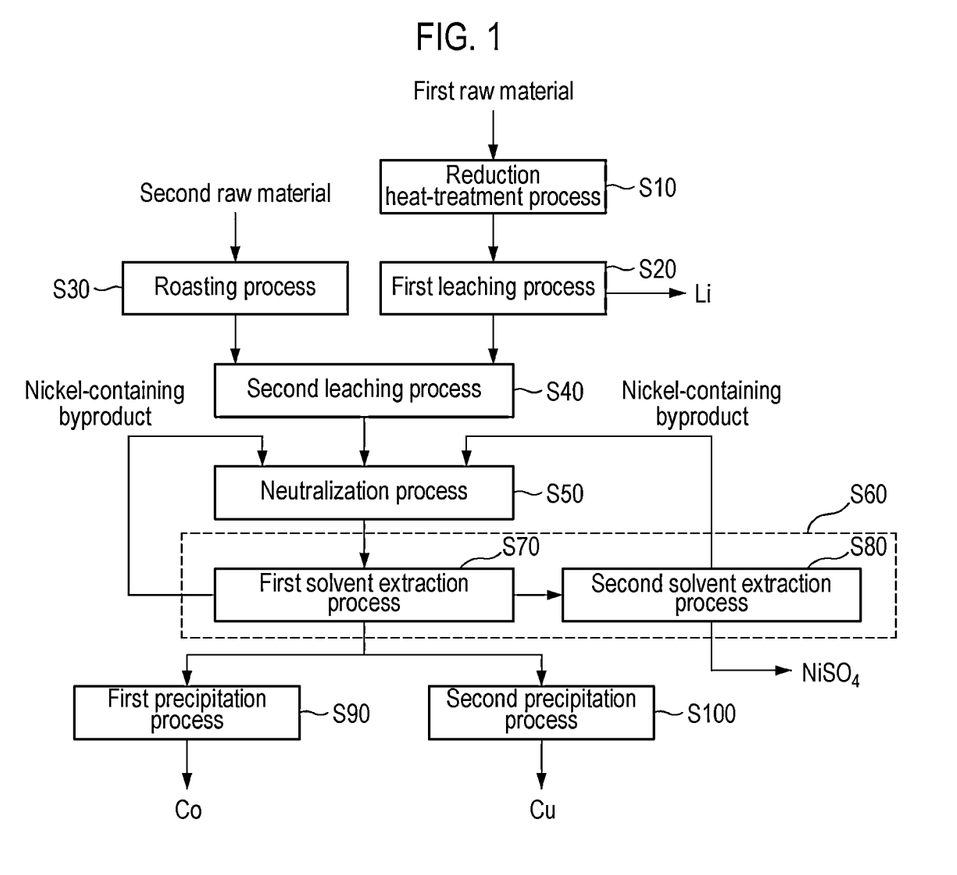
FIG. 1 is a diagram illustrating the entire processes for preparing a nickel sulfate aqueous solution according to an embodiment of the present disclosure.
Figure 2:
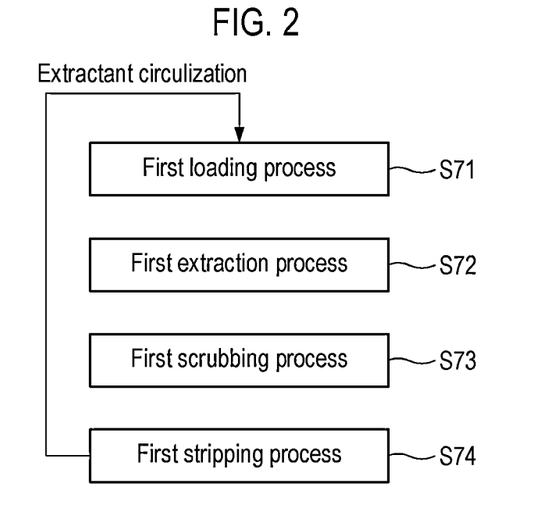
FIG. 2 is a diagram illustrating a first solvent extraction process among in the processes for preparing a nickel sulfate aqueous solution according to an embodiment.
Figure 3:
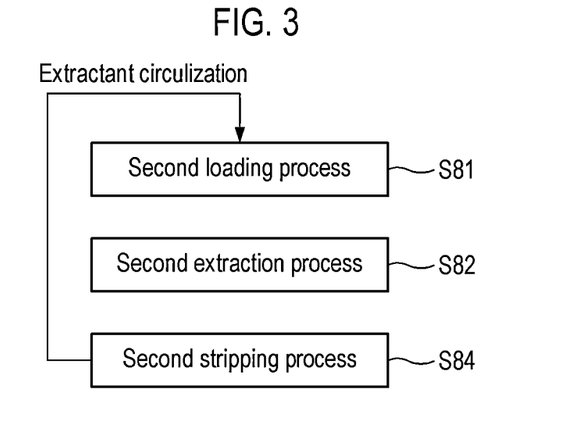
FIG. 3 is a diagram illustrating a second solvent extraction process among in the processes for preparing a nickel sulfate aqueous solution according to an embodiment.

FIG. 1 is a diagram showing the entire process for preparing a nickel sulfate aqueous solution according to an embodiment of the present disclosure. FIGS. 2 and 3 are diagrams illustrating a first and a second solvent extraction process, respectively, among the processes for preparing a nickel sulfate aqueous solution according to an embodiment.

Referring to FIGS. 1 to 3, a method for recovering nickel to a high purity through a series of processes, and for manufacturing a nickel aqueous solution using such smelted nickel, can be provided. This method can enhance versatility across various raw materials and products, operational stability, and purity, while reducing manufacturing costs. Hereinafter, each process will be described in detail with reference to the respective figures.

Raw Materials

As starting materials, first and second raw materials may each consist mainly of complex raw materials containing nickel. The starting materials may each independently include at least one selected from the group consisting of oxides, hydroxides, sulfides, and sulfates. For example, these oxides, hydroxides, sulfides, and sulfates may independently include ore, matte, black mass (BM), black powder (BP), mixed hydroxide precipitate (MHP), mixed carbonate precipitate (MCP), mixed sulfide precipitate (MSP), or a mixture thereof.

For instance, the first raw material may include black mass (BM), black powder (BP), mixed hydroxide precipitate (MHP), mixed carbonate precipitate (MCP), or a mixture thereof. The first raw material may contain impurities such as iron (Fe), cobalt (Co), copper (Cu), zinc (Zn), magnesium (Mg), sodium (Na), silicon (Si), or a combination thereof, in addition to nickel (Ni) and lithium (Li). By way of example, the composition of the first raw material may be given as shown in Table 1. The first raw material may contain nickel in the form of nickel oxide (NiO) or a nickel metal composite oxide mixed with other metals.

TABLE 1

| | (Unit wt %) | | | | | | | | |
|---|---|---|---|---|---|---|---|---|---|
| Ni | Li | Fe | Co | Cu | Zn | Mg | Al | Si | Mn |
| Content 5-35 | 0.001-5 | 0.001-1.5 | 0.1-10 | 0.1-7 | 0.01-2.0 | 0.01-18 | 0.01-2.0 | 0.01-35 | 0.01-5.5 |

The second raw material may include ore, matte, mixed sulfide precipitates, or a mixture thereof. For instance, the second raw material may contain impurities such as iron (Fe), cobalt (Co), copper (Cu), zinc (Zn), magnesium (Mg), sodium (Na), silicon (Si), or a combination thereof, in addition to nickel (Ni) and sulfide(S). By way of example, the composition of the second raw material may be given as shown in Table 2. The second raw material may contain nickel in the form of nickel sulfide (NiS).

TABLE 2

| | Ni | Fe | Co | Cu | Zn | Mn | Mg | Al | Si |
|---|---|---|---|---|---|---|---|---|---|
| | | | | | (Unit wt %) | | | | |
| Content | 6-30 | 5-45 | 0.1-1.0 | 0.1-5.0 | 0.01-1.0 | 0.01-1.0 | 0.3-15 | 0.1-1.0 | 10-30 |

Reduction Heat Treatment Process (S10)

As a preprocessing step for the first raw material, a reduction heat treatment process (S10) can be performed.

In the reduction heat treatment process (S10), thermal treatment in a reducing atmosphere may be conducted on the first raw material containing nickel and lithium in the form of complex oxides that can bind with various metals. This treatment may cause a phase transition to oxides and/or carbonates, transforming lithium-containing compounds into substances with high solubility in water or inorganic acids.

As such, by converting the compound form of the first raw material containing lithium through the reduction heat treatment process (S10) before proceeding to the first leaching process (S20) for leaching/extraction of lithium described later, the leaching efficiency in the first leaching process (S20) for leaching/extraction of lithium can be improved.

For example, the reduction heat treatment process (S10) can be carried out using thermal treatment equipment such as an electric furnace (e.g., box furnace) or a rotary kiln.

According to an embodiment of the present disclosure, the reduction heat treatment process (S10) can be performed by introducing the first raw material into the thermal treatment equipment and injecting nitrogen gas, at a temperature of 650 to 950° C. For instance, a certain amount of the first raw material can be loaded into the thermal treatment equipment, and while injecting enough nitrogen gas ($N_2$ gas) to maintain a reducing atmosphere, reduction heat treatment can proceed at 650 to 950° C. In this process, not only lithium but also other metals can react, undergoing a phase transition through reactions according to [Reaction Formula 1]. Additionally, further reactions can occur through [Reaction Formula 2] and [Reaction Formula 3].

$9LiNi_{1/3}Co_{1/3}Mn_{1/3}O_2+0.25C \rightarrow 3NiO+3MnO_2+Co_3O_4+4.5Li_2O+0.25CO_2(g)$ [Reaction Formula 1]

$4MnO_2+C \rightarrow 2Mn_2O_3+CO_2(g)$ [Reaction Formula 2]

$Li_2O+CO_2(g) \rightarrow Li_2CO_3$ [Reaction Formula 3]

First Leaching Process (S20)

In the first leaching process (S20), the raw materials containing nickel and lithium, which have undergone phase transition by the reduction heat treatment process (S10), can be leached.

The first leaching process (S20) can be performed after the reduction heat treatment process (S10). For example, the first leaching process (S20) can be carried out in a wet grinder. The wet grinder may be a ball mill, rod mill, bead mill, attrition mill, etc. The first leaching process may use a first leaching agent (e.g., inorganic acid, water, or their mixture) to selectively leach the treated lithium.

In an embodiment, the inorganic acid may be at least one selected from the group consisting of sulfuric acid ($H_2SO_4$), hydrochloric acid (HCl), and nitric acid ($HNO_3$). Diluted inorganic acid with water may be employed. Sulfuric acid produced by capturing sulfur dioxide gas generated in the subsequent roasting process (S30) can be used.

In an embodiment, water may be used as the first leaching agent. In such cases, lithium from the lithium-containing raw material can be leached in the form of lithium hydroxide (LiOH) through [Reaction Formula 4], producing a first leachate. The first leachate may contain lithium.

$Li_2CO_3+2H_2O \rightarrow 2LiOH+H_2O+CO_2$ [Reaction Formula 4]

In an embodiment, metals other than lithium may remain in the residue. For example, metals such as nickel (Ni), cobalt (Co), manganese (Mn), etc., may remain in the residue and be included in the first leaching residue.

The lithium concentration in the first leachate obtained from the first leaching process may be approximately 0.1 to 8.5 g/L. This leachate can be processed into lithium hydroxide monohydrate ($LiOH \cdot H_2O$), lithium carbonate ($Li_2CO_3$), lithium phosphate ($Li_3PO_4$), etc., through well-known precipitation and crystallization methods for use as raw materials in lithium-ion battery cathodes.

MHP and MCP generated in the lithium-ion battery recycling process, which may contain Li in addition to Ni, Co, Mn, can be used as the first raw material for performing the first leaching process.

Roasting Process (S30)

A roasting process (S30) can be performed as a preprocessing step for the second raw material.

In the roasting process (S30), phase transition of nickel-containing raw materials bound in various compounds may occur, along with the recycling of sulfur dioxide gas ($SO_2$ gas) generated during the thermal treatment process for the production of inorganic acids.

Before the roasting process (S30) is carried out, the second raw material containing nickel may be in the form of a sulfide, which can be converted to an oxide by the roasting process (S30). Leaching the nickel-containing second raw material directly in its sulfide state could result in low leaching efficiency due to the generation of hydrogen sulfide gas ($H_2S$ gas) and metal reprecipitation reactions. Therefore, by converting the compound form of the nickel-containing second raw material through the roasting process (S30) before conducting the second leaching process (S40), the leaching efficiency in the second leaching process (S40) can be improved. In this regard, the roasting process (S30) can be performed using thermal treatment equipment such as an electric furnace (Box Furnace) or a rotary kiln.

According to an embodiment of the present disclosure, the roasting process (S30) may include loading a certain amount of nickel-containing raw material into an electric furnace, injecting sufficient oxygen ($O_2$) for the conversion to nickel oxide, and conducting roasting at 650 to 950° C. During this process, not only nickel but also other impurities can react, undergoing a phase transition through the reaction described in [Reaction Formula 5], below. Moreover, the sulfur dioxide gas generated during the roasting process (S30) can be captured by a separate collection facility and converted to sulfuric acid ($H_2SO_4$) through mixing with water, which can then be used in subsequent leaching processes.

$2NiS+3O_2 \rightarrow 2NiO+2SO_2$ [Reaction Formula 5]

Second Leaching Process (S40)

In the second leaching process (S40), the post-roasting residue (calcine) that has undergone phase transition by the roasting process (S30), along with the first leaching residue remaining in the residue from the first leaching process (S20), can be leached. The second leaching process (S40) can be performed after both the roasting process (S30) and the first leaching process. In the second leaching process, the post-roasting residue can be leached in a high-temperature high-pressure reactor, while the first leaching residue can be leached in an atmospheric pressure reactor. In the second leaching process (S40), the leaching can be achieved using a second leaching agent (e.g., inorganic acid, or a mixture of inorganic acid and water). In an embodiment, the second leaching process (S40) can be conducted using inorganic acid. For instance, at least one inorganic acid selected from the group consisting of sulfuric acid ($H_2SO_4$), hydrochloric acid (HCl), and nitric acid ($HNO_3$), diluted inorganic acid with water, or sulfuric acid produced by capturing sulfur dioxide gas generated in the preceding roasting process (S30) may be used.

In an embodiment, sulfuric acid can be used as a second leaching agent. In this regard, nickel can be leached from the first leaching residue and post-roasting residue containing nickel in the form of nickel sulfate ($NiSO_4$), generating a second leachate, as per [Reaction Formula 6].

$$NiO + H_2SO_4 \rightarrow NiSO_4 + H_2O \qquad \text{[Reaction Formula 6]}$$

The second leaching process (S40) can be conducted at a temperature of approximately 150 to 250° C. and a pressure of 800 to 4300 kPa. The saturation vapor pressure due to the high reaction temperature can lead to the maintenance of a certain level of pressure, and an additional pressure can be applied for a complete reaction.

For example, the second leaching process (S40) can be conducted in an environment with an acidity of 100 to 200 g/L. The second leaching process (S40) can be performed in a low pH acidic environment to secure sufficient second leachate, followed by conducting a subsequent neutralization process (S50).

In an embodiment, not only nickel but also other impurities can be leached together. For example, impurities such as iron (Fe), cobalt (Co), copper (Cu), zinc (Zn), etc., can be leached along with nickel and included in the second leachate.

The nickel concentration in the second leachate obtained from the second leaching process (S40) can be approximately 45 to 105 g/L, and the residual acidity can be 10 to 80 g/L.

Neutralization Process (S50)

In the neutralization process (S50), the second leachate produced by the second leaching process (S40) can be neutralized. The neutralization process (S50) can be performed after the second leaching process (S40).

If the second leachate is produced in a high pH environment, the volume of the second leachate produced may be reduced.

In an embodiment, after securing sufficient second leachate by conducting the second leaching process (S40) in a low pH acidic environment, the neutralization process (S50) can be performed.

In the neutralization process (S50), a neutralizing agent can be introduced to increase the pH of the second leachate generated in the second leaching process (S40). The addition of the neutralizing agent may also prepare for a subsequent solvent extraction process.

In an embodiment, the neutralizing agent may be at least one selected from the group consisting of nickel-containing by-products (MHP, MCP), nickel hydroxide ($Ni(OH)_2$), nickel carbonate ($NiCO_3$), sodium hydroxide (NaOH), sodium carbonate ($Na_2CO_3$), calcium hydroxide ($Ca(OH)_2$), magnesium hydroxide ($Mg(OH)_2$), calcium oxide (CaO), and magnesium oxide (MgO).

The reason for using MHP and MCP as raw materials and also as neutralizing agents may be because hydroxides and carbonates generally have high solubility in acids even without roasting, which may eliminate the need for processing under expensive high-temperature and high-pressure leaching conditions, and may also consume the acid ($H_2SO_4$) remaining after the second leaching process (S40), thus preparing in advance for the purification process (S60) that occurs in a high pH range.

In an embodiment, the neutralization process (S50) can use the nickel-containing by-products in the form of a moist cake as a neutralizing agent. When using nickel-containing by-products, the amount of neutralizing agent added separately can be reduced due to the use of the by-products generated in the process, leading to cost savings. Additionally, the introduction of additional impurities can be prevented, and the concentration of nickel in the neutralized solution can be increased.

In an embodiment, the neutralization process (S50) may be carried out at 80° C. and a pH of about 2 to 4.5. During the process, a part of impurities including iron (Fe), aluminum (Al), etc. can be removed by precipitation.

In one embodiment, the neutralization process (S50) may be performed for at least 2 hours, and the residual acidity of the neutralized solution produced by this process can be 10 g/L or less. For example, the neutralization process (S50) can be performed for up to 10 hours.

Solvent Extraction Process (S60)

In the solvent extraction process (S60), nickel can be refined from the neutralized solution produced by the neutralization process (S50). The solvent extraction process (S60) can be carried out after the neutralization process (S50).

In an embodiment, the solvent extraction process (S60) may include a first solvent extraction process (S70) for refining nickel from the neutralized solution produced by the neutralization process (S50); and a second solvent extraction process for refining nickel from the post-first extraction solution produced by the first solvent extraction process.

First Solvent Extraction Process (S70)

In the first solvent extraction process (S70), nickel can be refined from the neutralized solution produced by the neutralization process (S50). The neutralized solution may be a neutralized leachate solution. The first solvent extraction process (S70) may be a process for removing impurities from the neutralized solution produced in the neutralization process (S50) to refine nickel, in which an organic extractant (first organic extractant) can be used.

The first solvent extraction process (S70) may include a first loading process (S71), a first extraction process (S72), a first scrubbing process (S73), and a first stripping process (S74). The organic extractant may be at least one selected from the group consisting of di-2-ethylhexyl phosphoric acid, mono-2-ethylhexyl(2-ethylhexyl)phosphonate, and bis (2,4,4-trimethylpentyl) phosphinic acid.

First Loading Process (S71)

The first loading process (S71) may be a process for increasing the concentration of nickel in the organic phase. The first loading process (S71) may involve loading nickel contained in a nickel sulfate ($NiSO_4$) aqueous solution into the first organic extractant using the nickel sulfate aqueous solution and the first organic extractant, thus transferring the nickel to the organic phase.

The volume ratio of the first organic extractant (organic phase) to the nickel sulfate aqueous solution (aqueous phase) in the first loading process (S71) may be 3.5 to 6.5. If the volume ratio of the organic phase to the aqueous phase in the first loading process (S71) is less than 3.5, the binding of the target metal (nickel) and the organic extractant may be incomplete, resulting in a low extraction rate (e.g., 85% or less). If the volume ratio of the organic phase to the aqueous phase in the first loading process (S71) exceeds 6.5, the process cost may increase due to the excessive use of the first organic extractant.

The first loading process (S71) can be carried out in a pH range of 4.5 to 6.0, and may use at least one selected from the group consisting of sodium hydroxide (NaOH) and sodium carbonate ($Na_2CO_3$) to adjust to the pH range.

After mixing the aqueous phase and the organic phase to complete the nickel extraction into the organic phase, phase separation can be achieved by the difference in specific gravity between the organic phase and the aqueous phase. Through phase separation, the post-first loading solution (aqueous phase) can be obtained. The post-first loading solution may be a nickel-containing aqueous solution from which most of the nickel has been extracted, with a nickel content of 0.1 to 4.5 g/L therein.

After precipitating the post-first loading solution, the precipitated nickel-containing byproduct can be used as a neutralizing agent in the neutralization process (S50). For example, nickel-containing byproducts such as nickel hydroxide ($Ni(OH)_2$) and nickel carbonate ($NiCO_3$) can be precipitated using precipitants such as sodium hydroxide (NaOH) and sodium carbonate ($Na_2CO_3$).

First Extraction Process (S72)

In the first extraction process (S72), mixing the neutralized solution with the nickel-containing post-first loading organic extractant can remove impurities contained in the neutralized solution, with the concomitant enrichment of nickel in the neutralized solution. The first extraction process (S72) may be performed after the first loading process (S71). The post-first loading organic extractant can be used to remove impurities in the first extraction process (S72).

The volume ratio of the post-first loading organic extractant (organic phase) to the neutralized solution (aqueous phase) in the first extraction process (S72) may range 1.5 to 4.5. If the volume ratio of the organic phase to the aqueous phase in the first extraction process (S72) is less than 1.5, the extraction efficiency of impurities may decrease (e.g., less than 75%). If the volume ratio of the organic phase to the aqueous phase in the first extraction process (S72) exceeds 4.5, the residual nickel in the organic phase may increase, reducing process efficiency. The pH range of the first extraction process (S72) may be about 3.5 to 5.0.

When the back extraction of nickel into the aqueous phase is completed by mixing the aqueous phase and the organic phase, phase separation can be achieved by the difference in specific gravity between the organic phase and the aqueous phase. Through phase separation, the post-first extraction solution (aqueous phase) can be obtained. The post-first extraction solution may be an aqueous solution containing nickel as the main component, with the nickel content ranging from 75 to 110 g/L.

First Scrubbing Process (S73)

In the first scrubbing process (S73), cobalt (Co), magnesium (Mg), manganese (Mn), and other impurities contained in the post-first extraction organic extractant may be recovered into the aqueous phase by mixing the post-first extraction organic extractant with an inorganic extractant. The first scrubbing process (S73) may be performed after the first extraction process (S72).

The inorganic extractant may be an inorganic acid, water, or a mixture thereof.

The volume ratio of the post-first extraction organic extractant (organic phase) to the inorganic extractant (aqueous phase) in the first scrubbing process (S73) may be 9.5 to 12.5. If the volume ratio of the organic phase to the aqueous phase in the first scrubbing process (S73) exceeds 12.5, the recovery rate of cobalt may decrease (e.g., less than 65%). If the volume ratio of the organic phase to the aqueous phase in the first scrubbing process (S73) is less than 9.5, the recovery rate of cobalt may increase, but the process cost may rise due to the unnecessary use of inorganic extractants. The pH range of the first scrubbing process (S73) may be about 2.0 to 3.0.

When the back extraction of impurities, including cobalt, into the aqueous phase is completed by mixing the aqueous phase and the organic phase, phase separation can be achieved by the difference in specific gravity between the organic phase and the aqueous phase. Through phase separation, the post-first scrubbing solution (aqueous phase) can be obtained. The post-first scrubbing solution may be an aqueous solution containing cobalt as the main component, with the cobalt content ranging from 3.5 to 8.5 g/L.

First Stripping Process (S74)

In the first stripping process (S74), the copper contained in the post-first extraction organic extractant may be recovered into an aqueous phase by mixing the post-first extraction organic extractant with an inorganic extractant with the concomitant recovery of the pure organic extractant. The first stripping process (S74) may be performed after the first scrubbing process (S73).

The inorganic extractant may be an inorganic acid, water, or a mixture thereof.

The volume ratio of the post-first extraction organic extractant (organic phase) to the inorganic extractant (aqueous phase) in the first stripping process (S74) may be 9.5 to 12.5. If the volume ratio of the organic phase to the aqueous phase in the first stripping process (S74) exceeds 12.5, the recovery rate of copper may decrease (e.g., less than 90%). If the volume ratio of the organic phase to the aqueous phase in the first stripping process (S74) is less than 9.5, the recovery rate of copper may increase, but the process cost may rise due to the unnecessary use of inorganic extractants. The pH range of the first stripping process (S74) can be about 0.5 to 1.5.

When the back extraction of copper into the aqueous phase is completed by mixing the aqueous phase and the organic phase, phase separation can be achieved by the difference in specific gravity between the organic phase and the aqueous phase. Through phase separation, the post-first stripping solution (aqueous phase) and the post-first stripping organic extractant (organic phase) can be obtained. The post-first stripping solution may be an aqueous solution containing copper as the main component, with the copper content ranging from 40 to 50 g/L. The post-first stripping organic extractant can be reused as the first organic extractant in the first loading process (S71) (see FIG. 2).

Second Solvent Extraction Process (S80)

In the second solvent extraction process (S80), nickel can be refined from the post-first extraction solution produced by the first solvent extraction process (S70). The second solvent extraction process (S80) may be performed after the first solvent extraction process (S70). The second solvent extraction process (S80) may be a process for refining nickel by removing impurities from the post-first extraction solution, using an organic extractant (second organic extractant).

The second solvent extraction process (S80) may include a second loading process (S81), a second extraction process (S82), and a second stripping process (S84). The organic extractant may be at least one selected from the group consisting of di-2-ethylhexyl phosphoric acid, mono-2-ethylhexyl(2-ethylhexyl)phosphonate, and bis (2,4,4-trimethylpentyl) phosphinic acid.

Second Loading Process (S81)

The second loading process (S81) may be a process for enriching nickel in the organic phase. The second loading process (S81) may involve loading nickel contained in a nickel sulfate ($NiSO_4$) aqueous solution into a second organic extractant using the nickel sulfate aqueous solution and the second organic extractant, thus transferring the nickel to the organic phase.

The volume ratio of the second organic extractant (organic phase) to the nickel sulfate aqueous solution (aqueous phase) in the second loading process (S81) may be 4.5 to 8.5. If the volume ratio of the organic phase to the aqueous phase in the second loading process (S81) is less than 4.5, the binding of the target metal (nickel) and the organic extractant may be incomplete, resulting in a low extraction rate (e.g., 90% or less). If the volume ratio of the organic phase to the aqueous phase in the second loading process (S81) exceeds 8.5, the process cost may increase due to the excessive use of the second organic extractant.

The second loading process (S81) may be carried out in a pH range of 5.5 to 6.5, and at least one selected from the group consisting of sodium hydroxide (NaOH) and sodium carbonate ($Na_2CO_3$) may be used for adjustment to the pH range.

After mixing the aqueous phase and the organic phase to complete the nickel extraction into the organic phase, phase separation can be achieved by the difference in specific gravity between the organic phase and the aqueous phase. Through phase separation, the post-second loading solution (aqueous phase) can be obtained. The post-second loading solution may be a nickel-containing aqueous solution from which most of the nickel has been extracted, with the nickel content ranging from 0.1 to 9.5 g/L.

After precipitating the post-second loading solution, the precipitated nickel-containing byproduct may be used as a neutralizing agent in the neutralization process (S50). For example, using precipitants such as sodium hydroxide (NaOH) and sodium carbonate ($Na_2CO_3$), nickel-containing byproducts such as nickel hydroxide ($Ni(OH)_2$) and nickel carbonate ($NiCO_3$) can be precipitated.

Second Extraction Process (S82)

In the second extraction process (S82), the post-first extraction solution from the first solvent extraction process (S70) may be mixed with the nickel-containing post-second loading organic extractant to remove impurities contained in the post-first extraction solution, with the concomitant enrichment of nickel in the post-first extraction solution. The second extraction process (S82) may be performed after the second loading process (S81). The post-second loading organic extractant can be used to remove impurities in the second extraction process (S82).

The volume ratio of the post-second loading organic extractant (organic phase) to the post-first extraction solution (aqueous phase) in the second extraction process (S82) may be 0.3 to 1.5. If the volume ratio of the organic phase to the aqueous phase in the second extraction process (S82) is less than 0.3, the extraction efficiency of impurities may decrease (e.g., less than 90%). If the volume ratio of the organic phase to the aqueous phase in the second extraction process (S82) exceeds 1.5, the residual nickel in the organic phase may increase, reducing process efficiency. The pH range of the second extraction process (S82) may be about 4.5 to 5.5.

When the back extraction of nickel into the aqueous phase is completed by mixing the aqueous phase and the organic phase, phase separation can be achieved by the difference in specific gravity between the organic phase and the aqueous phase. Through phase separation, the post-second extraction solution (aqueous phase) can be produced. The post-second extraction solution may be an aqueous solution containing nickel as the main component, with the nickel content ranging from 85 to 125 g/L. The post-second extraction solution can be used as a precursor material for the cathode active material of lithium secondary batteries.

Second Stripping Process (S84)

In the second stripping process (S84), impurities contained in the post-second extraction organic extractant may be recovered into an aqueous phase by mixing the post-second extraction organic extractant with an inorganic extractant, and the pure organic extractant can be recovered. The second stripping process (S84) may be performed after the second extraction process (S82).

The inorganic extractant may be an inorganic acid, water, or a mixture thereof.

The volume ratio of the post-second extraction organic extractant (organic phase) to the inorganic extractant (aqueous phase) in the second stripping process (S84) may be 3.5 to 7.5. If the volume ratio of the organic phase to the aqueous phase in the second stripping process (S84) exceeds 7.5, the impurity removal rate may decrease (e.g., less than 85%). If the volume ratio of the organic phase to the aqueous phase in the second stripping process (S84) is less than 3.5, the impurity removal rate may increase, but the process cost may rise due to the unnecessary use of inorganic extractants. The pH range of the second stripping process (S84) may be about 0.25 to 1.5.

When the back extraction of impurities into the aqueous phase is completed by mixing the aqueous phase and the organic phase, phase separation can be achieved by the difference in specific gravity between the organic phase and the aqueous phase. Through phase separation, the second post-stripping organic extractant (organic phase) can be obtained. The second post-stripping organic extractant can be reused as the second organic extractant in the second loading process (S81) (see FIG. 3).

First Precipitation Process (S90)

In the first precipitation process (S90), the post-first scrubbing solution produced by the first scrubbing process (S73) in the first solvent extraction process (S70) can be purified. The first precipitation process (S90) may be performed after the first scrubbing process (S73). The first precipitation process (S90) may be a process to remove magnesium and recover cobalt from the post-first scrubbing solution.

In an embodiment, a first precipitant may be used in the first precipitation process (S90) to remove magnesium. The first precipitant may be at least one selected from the group consisting of sodium fluoride (NaF), oxalic acid ($C_2H_2O_4$), sodium oxalate ($Na_2C_2O_4$), sodium hydroxide (NaOH), and sodium carbonate ($Na_2CO_3$). For example, if sodium fluoride is used as the first precipitant, the reaction may be conducted as illustrated in the following Reaction Formula 7:

$MgSO_4 + 2NaF \rightarrow MgF_2\downarrow + Na_2SO_4$ [Reaction Formula 7]

In the first precipitation process (S90), the first precipitant may be added at an equivalent ratio of about 1.0 to 3.0 relative to the magnesium contained in the post-first scrubbing solution. If the first precipitant is added at an equivalent ratio of less than 1.0 relative to magnesium, the precipitation rate of magnesium may be 80% or less, resulting in an incomplete reaction. If the first precipitant is added at an equivalent ratio of more than 3.0 relative to magnesium, excess impurities from the first precipitant may adversely affect the entire process. The pH range of the first precipitation process (S90) may be about 4.5 to 5.5.

When the precipitation reaction in the first precipitation process (S90) is completed, solid-liquid separation can be achieved through a commonly used solid-liquid separation process. Through solid-liquid separation, the post-first precipitation solution can be obtained. The post-first precipitation solution may be a cobalt-containing aqueous solution from which most impurities have been removed, with the cobalt content ranging from 20 to 45 g/L. The post-first precipitation solution can be used as a precursor material for the cathode active material of lithium secondary batteries through further purification.

Second Precipitation Process (S100)

In the second precipitation process (S100), the post-first stripping solution produced by the first stripping process (S74) in the first solvent extraction process (S70) can be purified. The second precipitation process (S100) may be performed after the first stripping process (S74). The second precipitation process (S100) may be a process to recover copper from the post-first stripping solution.

In one embodiment, a second precipitant may be used in the second precipitation process (S100) to remove copper. The second precipitant may be at least one selected from the group consisting of sodium sulfide ($Na_2S$), sodium hydrosulfide (NaSH), ammonium hydrogen sulfide ($NH_4HS$), hydrogen sulfide ($H_2S$), and sodium sulfide ($Na_2S$). For example, if sodium hydrosulfide is used as the second precipitant, the reaction may be conducted as illustrated in the following Chemical Formula 8:

$2CuSO_4 + 2NaSH \rightarrow Na_2SO_4 + H_2SO_4 + 2CuS\downarrow$ [Chemical Formula 8]

In the second precipitation process (S100), the second precipitant may be added at an equivalent ratio of about 0.8 to 2.0 relative to the copper contained in the post-first stripping solution. If the second precipitant is added at an equivalent ratio of less than 0.8 relative to copper, the recovery rate of copper may be 80% or less, resulting in an incomplete reaction. If the second precipitant is added at an equivalent ratio of more than 2.0 relative to copper, excess impurities from the second precipitant may adversely affect the entire process. The pH range of the second precipitation process (S100) may be about 2.0 to 3.0.

When the precipitation reaction in the second precipitation process (S100) is completed, solid-liquid separation can be achieved through a commonly used solid-liquid separation process. Through solid-liquid separation, the post-second precipitation residue can be obtained. The post-second precipitation residue may be a copper-containing precipitate, and the copper content may be 45 to 55 wt %. The post-first precipitation solution can be used as a precursor material for the cathode active material of lithium secondary batteries through further purification.

Experimental Examples

[Raw Material]

As shown in Table 3, below, the elements were mixed at predetermined ratios to prepare first raw materials A to C.

TABLE 3

(unit wt %)

| | Ni | Li | Co | Cu | Fe | Zn | Mg | Al | Mn |
|---|---|---|---|---|---|---|---|---|---|
| A | 26.0 | 4.5 | 5.0 | 0.7 | 0.01 | 0.005 | 0.004 | 0.5 | 4.5 |
| B | 12.0 | 0.001 | 0.3 | 2.7 | 34.0 | 0.02 | 2.0 | 0.4 | 0.02 |
| C | 35.0 | 0.1 | 3.0 | 0.01 | 0.05 | 0.5 | 3.0 | 0.06 | 6.0 |

* Each of the first raw materials contained sulfur (S), oxygen (O), and hydrogen (H) ions in addition to the metal ions to form 100 weight %.

A second raw material was prepared to contain elements as indicated in Table 4, below.

TABLE 4

(unit wt %)

| Ni | Fe | Co | Cu | Zn | Mn | Mg | Al | S |
|---|---|---|---|---|---|---|---|---|
| 13.6 | 32.8 | 0.3 | 2.0 | 0.02 | 0.02 | 2.5 | 0.4 | 25.7 |

* The second raw material contained oxygen (O) and hydrogen (H) ions in addition to the metal ions to form 100 weight %.

[Reduction Heat Treatment Process]

A reduction heat treatment was performed on the first raw material containing nickel, lithium, etc. Specifically, 2.0 kg of the raw material was loaded into a rotary kiln and then subjected to reduction heat treatment at 850° C. for 3 hours while a reduction atmosphere was maintained using nitrogen ($N_2$) gas, to afford a post-reduction heat treatment residue that was converted from lithium oxide ($Li_2O$) to lithium carbonate ($Li_2CO_3$).

[First Leaching Process]

Lithium recovery was performed through water leaching of the residue after the reduction heat treatment. Specifically, 100 g of the residue was loaded into a ball mill and then ground and leached with 2.5 L of water ($H_2O$) for 2 hours. Thereafter, solid-liquid separation using vacuum filtration yielded a first leach residue containing the elements shown in Table 5 and a first leachate containing the elements shown in Table 6 were secured.

TABLE 5

(unit wt %)

| Ni | Co | Fe | Mg | Al | Cu | Mn | Zn |
|---|---|---|---|---|---|---|---|
| 36.0 | 7.0 | 0.02 | 0.001 | 0.6 | 0.9 | 6.5 | 0.007 |

* In addition to the metal ions, oxygen (O) and hydrogen (H) ions were contained to form 100 weight %.

TABLE 6

(unit g/L)

| Li | Na | Co | Fe | Mg | Al | Cu | Mn | Zn |
|---|---|---|---|---|---|---|---|---|
| 1.8 | 24.0 | 0.1 | 0.02 | 0.01 | 0.05 | 0.1 | 0.05 | 0.01 |

[Roasting Process]

A roasting process was performed on a second raw material containing nickel and sulfur. In brief, 2 kg of the raw material was loaded into a rotary kiln and roasted at 850° C. for 3 hours while sufficiently injecting oxygen ($O_2$), to obtain roasted residue (calcine) that was converted from nickel sulfide (NiS) to nickel oxide (NiO).

[Second Leaching Process]

A raw material in which the post-reduction heat treatment residue and the post-roasting residue were mixed at a weight ratio of 2:8 was subjected to high-temperature, high-pressure leaching.

In an autoclave, a mixture of 450 g of the mixed raw materials and 3 L of water was maintained at an initial acidity of 120 g/L and a temperature of 240° C. under 3500 kPa for 3 hours to afford a second leachate with a nickel leaching rate of 95% and a nickel concentration of 60 g/L.

[Neutralization Process]

A neutralization process was performed using nickel-containing by-products in the second leachate solution.

By adjusting the pH of 2 L of the second leachate solution to 2.5 with the addition of nickel-containing by-products and maintaining same at 80° C. for 3 hours, a neutralized solution with a nickel concentration of 82 g/L was secured.

[First Solvent Extraction Process]

To refine the nickel contained in the neutralized solution, the first solvent extraction process was performed.

The first loading process is a process wherein nickel contained in a nickel sulfate aqueous solution was extracted using di-2-ethylhexyl phosphoric acid as an extractant to produce a nickel-containing organic extractant. A mixture of 500 mL of a nickel sulfate aqueous solution containing nickel at a concentration of 100 g/L and 2000 mL of the organic extractant was stirred for 10 minutes at pH 5.0, followed by phase separation based on the difference in specific gravity to back extract 95% of the nickel.

Next, the first extraction process was carried out to extract impurities contained in the neutralized solution into the organic phase while back-extracting nickel contained in the post-first loading organic extractant into the aqueous phase. A mixture of 500 mL of the neutralized solution and 1500 mL of the post-first loading organic extractant was stirred for 10 minutes at pH 4.0, followed by phase separation based on the difference in specific gravity to obtain a post-first extraction solution with a nickel concentration of 105 g/L.

Subsequently, the first scrubbing process was performed to extract cobalt contained in the post-first extraction organic extractant into the aqueous phase. A mixture of 1000 mL of the post-first extraction organic extractant and 100 mL of distilled water was stirred for 10 minutes at pH 2.5, followed by phase separation based on the difference in specific gravity to back extract obtain 95% of the cobalt was back-extracted.

Finally, the first stripping process was carried out to extract copper contained in the post-first scrubbing organic extractant into the aqueous phase. A mixture of 1000 mL of the post-first scrubbing organic extractant and 100 mL of distilled water was stirred for 10 minutes at pH 1.0, followed by phase separation based on the difference in specific gravity to back extract 95% of the copper.

[Second Solvent Extraction Process]

To further refine the nickel contained in the post-first extraction solution from the first solvent extraction process, the second solvent extraction process was performed.

In the second loading process, nickel contained in a nickel sulfate aqueous solution was extracted using bis(2,4,4-trimethylpentyl)phosphinic acid as the extractant to produce a nickel-containing organic extractant. In this regard, 1000 mL of a nickel sulfate aqueous solution containing nickel at a concentration of 110 g/L was mixed with 5500 mL of the organic extractant and stirred for 10 minutes at pH 6.5, followed by phase separation based on the difference in specific gravity to extract 95% of the nickel.

Next, the second extraction process was carried out to extract impurities contained in the post-first extraction solution into the organic phase while back-extracting nickel contained in the post-second loading organic extractant into the aqueous phase. A mixture of 1000 mL of the neutralized solution and 500 mL of the post-first loading organic extractant was stirred for 10 minutes at pH 5.0 and then subjected to phase separation based on the difference in specific gravity to obtain a post-second extraction solution with a nickel concentration of 115 g/L.

Finally, a second stripping process was performed to extract impurities contained in the post-second extraction organic extractant into the aqueous phase. In this regard, 500 mL of the post-second extraction organic extractant was mixed with 50 mL of distilled water and the mixture was stirred for 10 minutes at pH 1.0 and then subjected to phase separation based on the difference in specific gravity to back extract 95% of the impurities.

[First Precipitation Process]

To remove magnesium contained in the post-first scrubbing solution after the first solvent extraction process, the first precipitation process was performed.

By maintaining 1 L of the post-first scrubbing solution at a pH of 5.5 for 2 hours using sodium fluoride and sodium carbonate, magnesium was removed to give a post-first precipitation solution with a cobalt concentration of 27 g/L.

[Second Precipitation Process]

To recover copper contained in the post-first stripping solution after the first solvent extraction process, the second precipitation process was performed.

One liter of the post-first stripping solution was maintained at a pH of 2.5 for 2 hours using sodium hydrosulfide, followed by solid-liquid separation using vacuum filtration and washing with 1 L of distilled water (DIW), to obtain a post-second precipitation residue containing 51% copper.

Although the embodiments of the present disclosure have been described with reference to the accompanying drawings, those skilled in the art to which the present disclosure pertains will be able to understand that the embodiments can be implemented in other specific forms without changing the technical spirit or essential features of the present disclosure. Therefore, it should be understood that the embodiments described above are exemplary and not limitative in all respects. The scope of the present disclosure is defined by the claims rather than the detailed description. It should be construed that all changes or modified forms derived from the meaning and scope of the claims and equivalent concepts thereof are included in the scope of the present disclosure.

What is claimed is:

1. A method for preparing a nickel sulfate aqueous solution, the method comprising:
   (A-i) a reduction heat treatment process for thermally treating a first raw material containing nickel and lithium;
   (B) a first leaching process for leaching the heat-treated product produced by the reduction heat treatment process;
   (A-ii) a roasting process for thermally treating a second raw material containing nickel and sulfur;
   (C) a second leaching process for leaching the first leaching residue produced by the first leaching process and the calcine produced by the roasting process;
   (D) a neutralization process for neutralizing the second leached solution produced by the second leaching process; and (E) a solvent extraction process for refining nickel in the neutralized solution produced by the neutralization process to prepare the nickel sulfate aqueous solution.

2. The method of claim 1, wherein the first raw material and the second raw material each independently comprises at least one selected from the group consisting of an oxide, a hydroxide, a sulfide, and a sulfur oxide, the oxide, hydroxide, sulfide, and sulfur oxide each independently containing ore, matte, black mass (BM), black powder (BP), mixed hydroxide precipitate (MHP), mixed carbonate precipitate (MCP), mixed sulfide precipitate (MSP), or a mixture thereof.

3. The method of claim 1, wherein the first raw material comprises nickel in a form of nickel oxide or nickel metal composite oxide.

4. The method of claim 1, wherein the second raw material comprises nickel in a form of nickel sulfide.

5. The method of claim 1, wherein the reduction heat-treatment process is carried out at 650 to 950° C. in a manner of introducing the first raw material into a thermal treatment equipment and injecting nitrogen gas.

6. The method of claim 1, wherein the first leaching process is carried out using a first leaching agent including an inorganic acid, water, or a mixture thereof.

7. The method of claim 1, wherein the first leached solution obtained by the first leaching process contains lithium and the first leaching residue contains nickel.

8. The method of claim 1, wherein the roasting process is carried out at 650 to 950° C. in a manner of introducing the second raw material into a thermal treatment equipment and injecting oxygen gas.

9. The method of claim 1, wherein, in the second leaching process, the first leaching residue and the calcine are leached in an atmospheric reactor and a high-temperature, high-pressure reactor, respectively.

10. The method of claim 1, wherein the neutralizing process is carried out using a neutralizing agent including MHP, MCP, nickel hydroxide ($Ni(OH)_2$), nickel carbonate ($NiCO_3$), sodium hydroxide (NaOH), sodium carbonate ($Na_2CO_3$), calcium hydroxide ($Ca(OH)_2$), magnesium hydroxide ($Mg(OH)_2$), calcium oxide (CaO), magnesium oxide (MgO), or a mixture thereof.

11. The method of claim 1, wherein the neutralization process is carried out at 80° C. and a pH of 2 to 4.5.

12. The method of claim 1, wherein the neutralization is carried out for 2 hours or more and the neutralized solution produced by the neutralization process has a residual acidity of 10 g/L or less.

13. The method of claim 1, wherein the solvent extraction process comprises:

(E-i) a first solvent extraction process for refining nickel from the neutralized solution produced by the neutralization process; and (E-ii) a second solvent extraction process for refining nickel from the post-first extraction solution produced by the first solvent extraction process.

14. The method of claim 13, wherein the first solvent extraction process is performed by:

(i) a first loading process for loading nickel into an organic phase by adding a first organic extractant to a nickel sulfate aqueous solution;

(ii) a first extraction process for back extracting nickel into an aqueous phase by adding the post-first loading organic extractant to the neutralized solution;

(iii) a first scrubbing process for recovering cobalt into an aqueous phase by adding an inorganic extractant into the post-first extraction organic extractant;

(iv) a first stripping process for recovering copper into an aqueous phase by adding an inorganic extractant to the post-first scrubbing organic extractant; or a combination of the above steps, as follows: (i) and (ii); (i), (ii), and (iii); or (i), (ii), (iii), and (iv).

15. The method of claim 14, wherein the first organic extractant in the first loading process is used at a volume ratio of 3.5 to 6.5 to the nickel sulfate aqueous solution.

16. The method of claim 14, wherein after the post-first loading solution produced by the first loading process is allowed to undergo precipitation, the nickel-containing byproduct thus precipitated is used as a neutralization agent in the neutralization process.

17. The method of claim 14, wherein after the post-first loading in the first extraction process, the organic extractant is used at a volume ratio of 1.5 to 4.5 to the neutralized solution in the first extraction process.

18. The method of claim 14, wherein volume ratios of the inorganic extractants to the organic extractants in the first scrubbing process and the first stripping process each range from 9.5 to 12.5.

19. The method of claim 14, wherein the first scrubbing process is carried out at a pH of 2 to 3.

20. The method of claim 14, wherein the first stripping process is carried out at a pH of 0.5 to 1.5.

21. The method of claim 14, wherein the post-first stripping organic extractant is reused as the first organic extractant.

22. The method of claim 14, further comprising a first precipitation process for recovering cobalt by adding a first precipitation agent to the post-first scrubbing solution produced by the first scrubbing process.

23. The method of claim 14, further comprising a second precipitation process for recovering copper by adding a second precipitation agent to the post-first stripping solution produced by the first stripping process.

24. The method of claim 13, wherein the second solvent extraction process is carried out by:

(i) a second loading process for loading nickel into an organic phase by adding a second organic extractant to a nickel sulfate aqueous solution;

(ii) a second extraction process for back extracting nickel into an aqueous phase by adding the post-second loading organic extractant to the post-first extraction solution;

(iii) a second stripping process for recovering impurities into an aqueous phase by adding an inorganic extractant to the post-second extraction organic extractant; or a combination of the above steps, as follows: (i) and (ii); or (i), (ii), and (iii).

25. The method of claim 24, wherein the second organic extractant is used at a volume ratio of 4.5 to 8.5 to the nickel sulfate aqueous solution in the second loading process.

26. The method of claim 24, wherein after the post-second loading solution produced by the second loading process is allowed to undergo precipitation, the nickel-containing byproduct thus precipitated is used as a neutralization agent in the neutralization process.

27. The method of claim 24, wherein the post-second loading organic extractant is used at a volume ratio of 0.3 to 1.5 to the post-first extraction solution in the second extraction process.

28. The method of claim 24, wherein the organic extractant is used at a volume ratio of 3.5 to 7.5 to the inorganic extractant in the second stripping process.

29. The method of claim 24, wherein the second stripping process is carried out at a pH of 0.25 to 1.5.

30. The method of claim 24, wherein the post-second stripping organic extractant is reused as a second organic extractant.

\* \* \* \* \*